(No Model.)

J. C. J. C. FAVRE.
COIN CONTROLLED WEIGHING MACHINE.

No. 406,132. Patented July 2, 1889.

Witnesses:

Inventor
J. C. J. C. Favre
Per Attys.

UNITED STATES PATENT OFFICE.

JEAN CLAUDIUS JULES CESAR FAVRE, OF MONTREAL, QUEBEC, CANADA, ASSIGNOR, BY MESNE ASSIGNMENTS, TO THE AMERICAN AUTOMATON WEIGHING MACHINE COMPANY, OF NEW YORK.

COIN-CONTROLLED WEIGHING-MACHINE.

SPECIFICATION forming part of Letters Patent No. 406,132, dated July 2, 1889.

Application filed September 29, 1886. Serial No. 214,880. (No model.) Patented in Canada October 16, 1886, No. 25,147.

*To all whom it may concern:*

Be it known that I, JEAN CLAUDIUS JULES CESAR FAVRE, of the city of Montreal, in the District of Montreal and Province of Quebec, Canada, have invented certain new and useful Improvements in Coin-Controlled Weighing-Machines, (for which I have procured Letters Patent of the Dominion of Canada, dated October 16, 1886, No. 25,147;) and I do hereby declare that the following is a full, clear, and exact description of the same.

In my patent granted November 20, 1888, namely, No. 393,325, is set forth a weighing-machine in which the weighing mechanism is normally held from operation by a locking device and released by the introduction of a coin into the machine. In the apparatus set forth in this application the release is effected by the closing of an electric circuit through the coin.

My present invention relates to apparatus of the same general character, but in which I dispense with the battery and other electrical appliances and effect the release of the weighing mechanism solely by the mechanical action of the introduced coin. It is in this that my invention mainly consists; but it also consists in the combination, with the said apparatus, of means for moving the locking device to lock the weighing mechanism in order to prevent unauthorized repetitions of the weighing while the scale is depressed, and also, in combination with the said invention, of a conduit or passage, through which the coin falls to reach the mechanism, made in two sections or stages, the upper one of which is placed at such an angle that only a disk such as a coin will pass through it, while the lower part is so constructed as to let fall any coin of less diameter than that determined upon to operate the machine.

My invention also consists in the various novel devices and combinations of devices employed by me to produce a simple and effective machine and to prevent the fraudulent use thereof, as hereinafter set forth and claimed.

For full comprehension, however, of my invention, reference must be had to the annexed drawings, forming part of this specification, in which—

Figure 1:
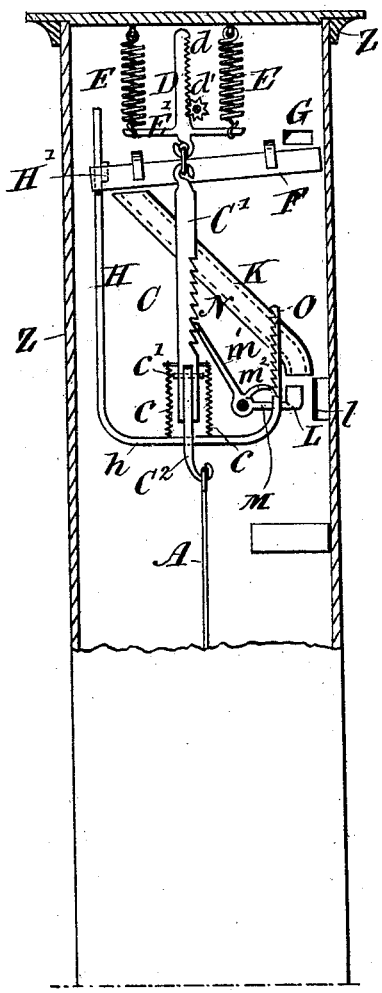
Figure 2:
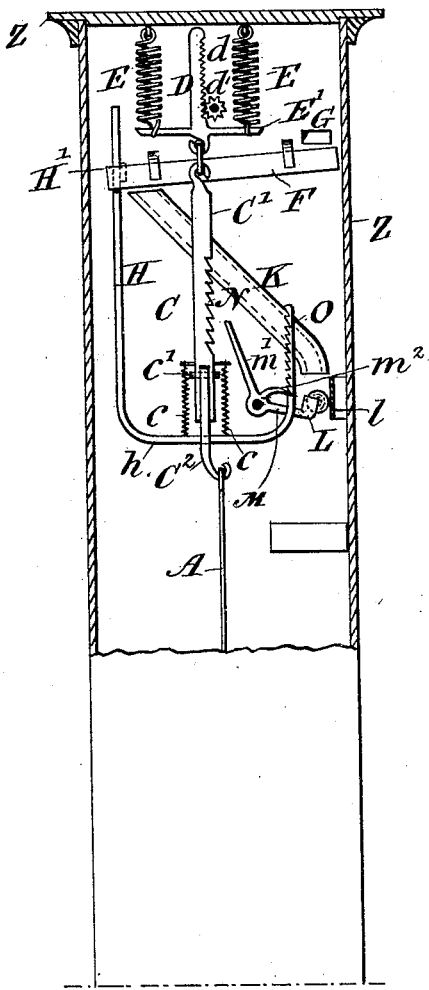
Figure 3:
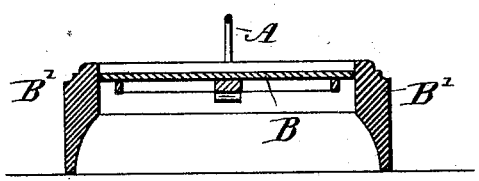

Figure 1 is a back view of the mechanism when locked; Fig. 2, a similar view showing the machine when ready to perform the operation of weighing; Fig. 3, a section through the platform, and Fig. 4 a detail of the conduit or runway.

The same letters of reference indicate the same or like parts.

A is the rod, drawn down in the usual way by pressure on the platform B, and C an intermediate link or section connected to A and to be presently more particularly described.

D is the top link of the rod, attached to the section C and having formed upon it a rack $d$, which engages with a pinion $d'$, the spindle of which carries the marking-needle, these parts, with the dial-case Z, springs E, and cross-head E', being of any usual construction.

The link or section C is formed in two parts, the upper part C' being forked to receive the lower one $C^2$, which is carried by springs $c\ c$, attached to it and to the part or section C'. $c'$ is a guide-pin, secured to the part $C^2$ and moving in vertical slots in the sides of the part C'.

Figure 4:
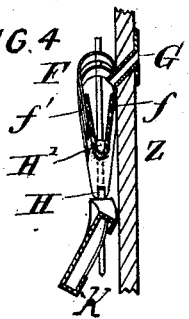

F is the upper conduit, into which the money falls when put in through the opening G. It is formed, as shown in Fig. 4, with inclined sides $f\ f'$, one side $f$ being secured to the front casing Z and the other held against it with the bottom edges touching by means of springs or similar devices. This conduit is set at an angle which will only permit a rounded article to pass along it, those of any other shape resting in it until dropped by the sides $f\ f'$ being forced apart by the drawing down of a rod H, arranged at an angle with and carried by an arm $h$, projecting from the part or section $C^2$, and having near its end a button H'.

K is the second conduit of the section shown and of just sufficient size to allow the proper coin to pass along it.

L is the receptacle into which the coin falls, mounted on one arm $m$ of a bell-crank lever M, pivoted to the front of the case. This receptacle L is open at the end, and the coin rests partly in it and partly against a plate $l$, which is fixed to the casing. The other arm $m'$ of the bell-crank lever M engages with a rack N, formed on the part or section C'.

$m^2$ is a third arm or projection from the bell-crank lever M, and it is acted upon by the teeth (set in the reverse way to those of the rack N) of a vertical rack O, carried on the projecting arm $h$.

The moving platform B is, as shown in Fig. 3, sunk below the level of the fixed rim or edge B' of the stand.

The operation of my invention is as follows, the parts being in the position shown in Fig. 1—viz., with the mechanism locked: When the proper coin is introduced, it passes along the conduits F and K into the receptacle L, depressing by its gravity or weight the arm $m$ and disengaging the arm $m'$ from the rack N, thus unlocking the mechanism and making it possible for any man to weigh himself. At the same time, and by the depression of the arm $m$, the projection or third arm $m^2$ is brought into contact with the reversed rack O, which, when drawn down by the rod A in the operation of weighing, passes over it. The weight in the box or receptacle L will continue to depress the arm $m$ until it has passed the plate $l$, when the coin will roll out and fall into any drawer or box arranged for the purpose, the arm $m'$ still remaining out of contact with the rack N. So soon, however, as the pressure on the platform is in any way lessened the springs $c\ c$ and E E will draw up the section or link C², and with it the rack O, which, striking against the projection $m^2$, will throw the arm $m'$ over and bring it in contact with the rack N, thus preventing any downward movement. The springs E E will restore the parts to their normal position and bring the needle back to zero.

Should any object other than a coin be introduced, it will simply remain in the conduit F until any pressure on the platform draws down the part C² and with it the rod H. The button H' will then force apart the sides $f\ f'$ and allow the substance to fall out. The wrong coin or one of less denomination than that required will drop out of the conduit K, with the same result—viz., that of keeping the mechanism fixed.

By making the platform with the standing plate proper B sunk below the level of the rim B', I render it almost impossible for any one to hold down the platform by pressing the point of the foot upon it.

It will be seen that by the construction above described the lower part of the rod and the section C² may be drawn down by pressure on the platform to the extent of the springs $c\ c$ without unlocking the mechanism.

I do not broadly claim herein the combination, with weighing mechanism, of a locking device therefor adapted to release said mechanism upon the insertion of a coin, since this is covered by my prior patent above referred to, which was filed January 23, 1886, Serial No. 189,535, and upon which Letters Patent issued, dated November 20, 1888, No. 393,325.

What I claim is as follows:

1. In a coin-controlled weighing-machine, the combination, with a weighing mechanism, of a locking device normally engaging said mechanism to hold it from operation, and adapted to be moved by the gravity of a coin inserted into the machine, so as to release said mechanism, substantially as described.

2. In a weighing-machine, the combination, with weighing mechanism, of a pivoted lever normally engaging said mechanism to hold it from operation, and adapted to be moved by the gravity of a coin inserted in the machine, whereby said mechanism is released, substantially as set forth.

3. In a weighing-machine, the combination, with weighing mechanism, of a pivoted lever normally engaging said mechanism to hold it from operation and situated in the path of a coin inserted in the machine, whereby such coin will move said lever to release such mechanism, substantially as set forth.

4. In a weighing-machine, the combination, with weighing mechanism, of a weighted lever normally engaging said mechanism to hold it from operation, and adapted to be moved by the force of a coin inserted in the machine, so as to release said mechanism and thereafter to return to its normal position, substantially as set forth.

5. In a weighing-machine, the combination, with weighing mechanism, of a coin-passage, a lever normally closing such passage and engaging with said mechanism to hold it from operation, and adapted to be moved by the gravity of the coin, so as to release such mechanism and also to permit the passage of the coin, substantially as set forth.

6. In a weighing-machine, the combination, with weighing mechanism, of a locking device normally holding such mechanism from operation, and adapted to release the same when a coin is inserted in the machine, and means for moving the locking device to lock the weighing mechanism, substantially as and for the purpose set forth.

7. In a weighing-machine, the combination, with the actuating-rod made in two parts joined by springs, one of which parts is normally locked from movement, of the coin-conduit and the discharging-arm carried by the normally-movable portion of said rod for removing any foreign body from said conduit, substantially as set forth.

8. In a weighing-machine, the combination, with the actuating-rod, of a three-armed lever, one arm of which normally engages said rod to hold it from movement, a rack moving with said rod and adapted to engage another arm of said lever, and the third arm being in the path of a coin inserted in the machine, substantially as set forth.

9. In a coin-controlled weighing-machine, the combination, with an inclined coin-conduit having separable sides, connected together, of a separating device lying between said sides, and a lever for depressing said device to spread the sides of the conduit apart, substantially as described.

JEAN CLAUDIUS JULES CESAR FAVRE.

Witnesses:
W. P. McFEEAT,
OWEN M. EVANS.